US007477896B2

(12) United States Patent
Rick et al.

(10) Patent No.: US 7,477,896 B2
(45) Date of Patent: Jan. 13, 2009

(54) REDUCING MISSED PAGES DURING CELL RESELECTION IN A WIRELESS COMMUNICATION SYSTEM

(75) Inventors: Roland Rick, San Diego, CA (US); Rodger Constandse, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 117 days.

(21) Appl. No.: 10/650,401

(22) Filed: Aug. 28, 2003

(65) Prior Publication Data
US 2005/0048982 A1    Mar. 3, 2005

(51) Int. Cl.
*H04Q 7/20* (2006.01)
(52) U.S. Cl. .................. 455/436; 455/450; 455/449; 455/458; 455/437; 370/352; 370/331; 370/332
(58) Field of Classification Search .......... 455/442, 455/449, 436, 437, 458, 450; 370/331, 332, 370/352
See application file for complete search history.

(56) References Cited

U.S. PATENT DOCUMENTS

| | | | | |
|---|---|---|---|---|
| 4,527,284 | A | | 7/1985 | Rottger ................. 455/33 |
| 5,129,097 | A | | 7/1992 | Suzuki et al. ............ 455/33.2 |
| 5,384,824 | A | * | 1/1995 | Alvesalo ................. 455/456.2 |
| 5,574,996 | A | | 11/1996 | Raith .................... 455/161.3 |
| 5,577,047 | A | * | 11/1996 | Persson et al. ............. 370/333 |
| 5,828,661 | A | * | 10/1998 | Weaver et al. ............ 370/331 |
| 5,854,785 | A | * | 12/1998 | Willey ................... 370/332 |
| 6,161,013 | A | * | 12/2000 | Anderson et al. .......... 455/437 |
| 6,178,164 | B1 | * | 1/2001 | Wang et al. ............. 370/331 |
| 6,377,803 | B1 | | 4/2002 | Ruohonen ............... 455/434 |

(Continued)

FOREIGN PATENT DOCUMENTS

| | | |
|---|---|---|
| WO | 0027158 | 5/2000 |
| WO | 0126407 | 4/2001 |

OTHER PUBLICATIONS

International Search Report PCT/US04/025149, International Search Authority-European Patent Office, Feb. 16, 2005.

(Continued)

*Primary Examiner*—Dwayne D Bost
*Assistant Examiner*—Pierre-Louis Desir
(74) *Attorney, Agent, or Firm*—Darren M. Simon; Kam T. Tam; Thomas R. Rouse

(57) ABSTRACT

Techniques are provided for reducing the likelihood of missed pages during cell reselection. For cell reselection with early camping, a terminal determines that reselection from a first base station to a second base station is required. The terminal then performs cell reselection and receives sufficient system information to process a paging channel for the second base station. The terminal starts monitoring the paging channel upon receiving this information and prior to completing the cell reselection. For cell reselection with reconfirmation, the terminal receives and decodes a control channel for the second base station prior to performing cell reselection. For cell reselection with overlapping page reception, the terminal monitors the paging channel for the first base station until a terminating event occurs and starts monitoring the paging channel for the second base station upon receiving sufficient system information. The monitoring of the two paging channels overlaps in time.

22 Claims, 11 Drawing Sheets

U.S. PATENT DOCUMENTS

| | | | |
|---|---|---|---|
| 6,505,042 B1* | 1/2003 | Hafiz | 455/434 |
| 2001/0016493 A1 | 8/2001 | Kim et al. | 455/436 |
| 2003/0125073 A1 | 7/2003 | Tsai et al. | 455/552 |
| 2003/0174674 A1* | 9/2003 | Lee et al. | 370/331 |
| 2005/0148349 A1* | 7/2005 | Putcha et al. | 455/458 |

OTHER PUBLICATIONS

3GPP TS 05.01 v8.7.0 3RD Generation Partnership Project; Technical Specification Group GSM/EDGE Radio Access Network; Physical Layer on the Radio Path; General Description (Release 1999) Global System for Mobile Communication; (Apr. 2003).

3GPP TS 05.08 v8.17.0 3RD Generation Partnership Project; Technical Specification Group GSM/EDGE Radio Access Network; Radio Subsystem Link Control (Release 1999) Global System for Mobile Communication; (Jun. 2003).

TIA/EIA/IS-95;"Mobile Station-Base Station Compatibility Standard for Dual-Mode Wideband Spread Spectrum Cellular System"(Jul. 1993).

TIA-856-A,"CDMA2000 High Rate Packet Data Air Interface Specification"(Apr. 2004).

* cited by examiner

REDUCING MISSED PAGES DURING CELL RESELECTION IN A WIRELESS COMMUNICATION SYSTEM

BACKGROUND

I. Field

The present invention relates generally to communication, and more specifically to techniques for reducing the likelihood of missing pages during cell reselection in a wireless communication system.

II. Background

A terminal in a wireless communication system (e.g., a cellular phone in a cellular system) is typically designed to operate in one of several modes, such as active and idle, at any given moment. In the active mode, the terminal can actively exchange data with one or more base stations in the system (e.g., for a voice or data call). In the idle mode, which is also referred to as standby mode, the terminal typically monitors a paging channel for messages alerting the terminal to the presence of incoming calls.

In a Global System for Mobile Communications (GSM) system, a terminal that is just powered on or has just lost coverage initially searches for "suitable" cells from which it can receive service. A "cell" can refer to a base station in the system and/or the coverage area of the base station, depending on the context in which the term is used. A suitable cell is one that meets a set of criteria defined by GSM. If a suitable cell is found, then the terminal performs registration with the cell as necessary. The terminal then "camps" on the cell if it is in the idle mode. While camped on the cell, the terminal performs tasks as specified by GSM so that it can (1) receive system information from the cell, (2) receive paging messages from the cell (e.g., alerting the terminal to incoming calls), and (3) initiate call setup for outgoing calls or other actions. The cell on which the terminal is camped is referred to as the "serving cell."

While camped on the cell, the terminal periodically checks to see if there is a better cell that it can camp on and receive service (e.g., another cell with a higher received signal level). The terminal may also select another serving cell if, for example, the current serving cell has become barred, the terminal cannot receive the signal from the current serving cell because the channel condition has degraded, and so on. The process of selecting another serving cell is referred to as "cell reselection." The terminal performs cell reselection while in the idle mode so that it can monitor the system for incoming paging messages and initiate a call even if the channel condition changes (e.g., if the terminal moves to a new location).

A key challenge in a GSM system (and in other cellular systems) is performing cell reselection while in the idle mode without missing an incoming call. In one conventional method of performing cell reselection in GSM, a terminal (1) obtains the necessary measurements and determines that a reselection to a new cell is needed, (2) switches to the new cell and gathers all of the required system information for the new cell, and then (3) starts receiving paging messages from the new cell. For this method, the terminal receives paging messages from the old serving cell up to the time the reselection decision is made, and starts receiving paging messages from the new cell after it has gathered all of the required system information. The terminal does not receive paging messages during the time that it is gathering system information for the new cell, which may take from approximately one to ten seconds in GSM. The terminal would then miss any page messages sent to it during this time period, which is highly undesirable.

There is therefore a need in the art for techniques to reduce the likelihood of missing paging messages during cell reselection.

SUMMARY

Techniques are provided herein for reducing the likelihood of missing pages during cell reselection in a wireless communication system (e.g., a GSM system). These techniques include cell reselection with "early camping", "reconfirmation" and/or overlapping page reception.

For cell reselection with early camping, a terminal initially determines that reselection from a first base station for the current serving cell (i.e., the "old cell") to a second base station for a new serving cell (i.e., the "new cell") is required. The terminal then performs a cell reselection procedure for the second base station. For GSM, the cell reselection procedure includes receiving full system information for the new cell. Prior to completing the cell reselection procedure, the terminal receives sufficient system information to process a paging channel for the second base station. For GSM, the sufficient system information is carried in a System Information Type 3 message, which is one of the messages received by the terminal to gather the full system information. The terminal starts monitoring the paging channel for the second base station upon receiving the sufficient system information and prior to completing the cell reselection procedure.

For cell reselection with reconfirmation, the terminal initially determines that reselection from the first base station to the second base station cell is required. However, instead of immediately switching to the second base station, the terminal receives and decodes designated system information from a control channel for the second base station while still monitoring the paging channel from the first base station. If the designated system information is decoded successfully, then the terminal switches to the second base station and performs the cell reselection procedure for the second base station. Otherwise, the terminal skips the cell reselection and remains on the old cell. The reception of the designated system information is to "reconfirm" that the terminal can decode the second base station before switching to this base station. If the designated system information includes the sufficient system information to process the paging channel for the second base station, then the terminal can start monitoring this paging channel upon initiating the cell reselection procedure. Otherwise, the terminal can perform early camping and start monitoring this paging channel upon receiving the sufficient system information from the second base station.

For cell reselection with overlapping page reception, the terminal initially determines that reselection from the first base station to the second base station is required. The terminal then performs the cell reselection procedure for the second base station. The terminal monitors the paging channel for the first base station until a terminating event occurs at some time instant after the cell reselection procedure has been initiated. The terminal receives sufficient system information to process the paging channel for the second base station during the cell reselection procedure and starts monitoring this paging channel from this time onward. The monitoring of the paging channel for the first base station and the monitoring of the paging channel for the second base station overlap in time. The terminating event may be (1) reception of the first paging message on the paging channel for the second base station (e.g., if the old and new cells are in the same location area), (2) registration with the second base station (e.g., if the old and new cells are in different location areas), or (3) some other action or event.

For all of the techniques described above, the terminal may receive a paging message on the paging channel for the first or second base station prior to completing the cell reselection procedure. The terminal may store the paging message and respond to the page via the second base station after completing the cell reselection procedure. Alternatively, the terminal may abort the cell reselection procedure and respond to the page via the first base station.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
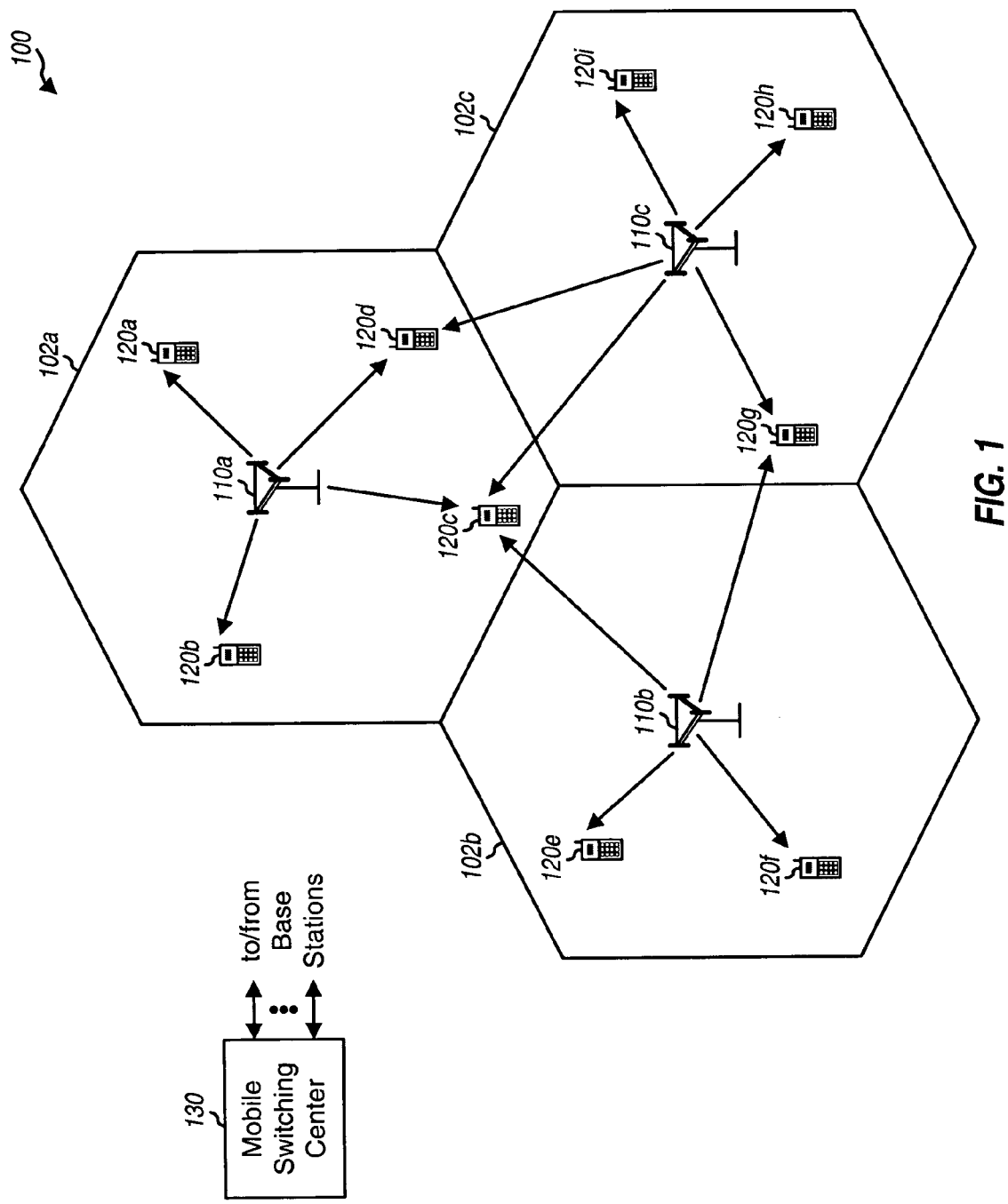
FIG. 1 shows a wireless communication system.

FIG. 1 shows a wireless communication system 100 with a number of base stations 110 that provide communication for a number of terminals 120. A base station is a fixed station and may also be referred to as a base transceiver station (BTS), a Node B, an access point, or some other terminology. Terminals 120 are typically dispersed throughout the system. A terminal may be fixed or mobile and may also be referred to as a mobile station (MS), a mobile equipment (ME), a user equipment (UE), a wireless communication device, or some other terminology. A mobile switching center (MSC) 130 provides coordination and control for base stations 110 and further controls the routing of data to/from the terminals served by these base stations. An MSC may also be referred to as a radio network controller (RNC) or some other terminology.

System 100 may be a Time Division Multiple Access (TDMA) system that may implement one or more TDMA standards such as GSM. System 100 may also be a Code Division Multiple Access (CDMA) system that may implement one or more CDMA standards such as Wideband-CDMA (W-CDMA), IS-2000, IS-856, IS-95, and so on. These standards are well known in the art.

The techniques described herein for reducing the likelihood of missing pages during cell reselection may be used for various wireless communication systems. For clarity, these techniques are specifically described for a GSM system.

Figure 2:
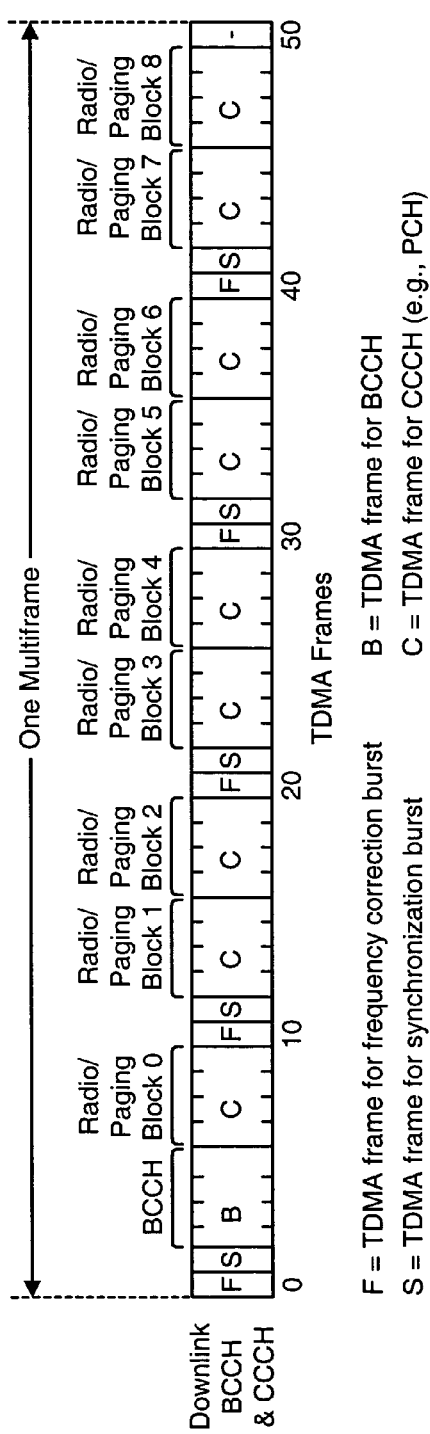
FIG. 2 shows the channel organization for the control channels in GSM.

FIG. 2 shows a channel configuration for the control channels in GSM. The timeline for data transmission is divided into multiframes. For the control channels, each multiframe has a duration of 235.365 msec and is partitioned into 51 TDMA frames, which are labeled as TDMA frames 0 through 50. Although not shown in FIG. 2, each TDMA frame is further partitioned into 8 time slots, which are labeled as time slots 0 through 7. Time slot 0 is used for the control channels and times slots 1 through 7 are used for traffic channels. The data transmission in each time slot is referred to as a "burst".

The control channels for GSM include a frequency correction channel (FCCH), a synchronization channel (SCH), a broadcast control channel (BCCH), and a common control channel (CCCH). The FCCH carries information used by a terminal for frequency correction and is sent in TDMA frames 0, 10, 20, 30 and 40 of each multiframe. The SCH carries (1) a reduced TDMA frame number (RFN) used by a terminal to synchronize its timing and frame numbering and (2) a base transceiver station identity code (BSIC) used to identify the transmitting base station. The SCH is sent in TDMA frames 1, 11, 21, 31 and 41 of each multiframe.

The BCCH carries system information and is sent in TDMA frames 2, 3, 4 and 5 of each multiframe. The CCCH carries control information and is also used to implement a paging channel (PCH). The PCH carries paging messages, e.g., to alert idle mode terminals of incoming calls. The CCCH includes nine radio blocks in each multiframe, where each radio block spans four consecutive TDMA frames. Some or all of the CCCH radio blocks may be used for the PCH. A CCCH radio block used for the PCH is referred to as a "paging block". One paging message can be sent in each paging block.

FIG. 2 shows one of multiple channel configurations that can carry CCCH channels for paging the terminals. Other possible combinations of channels for the 51-frame multiframe exist. Moreover, time slots other than time slot 0 can carry the CCCH channels. However, the specific channel combination shown in FIG. 2 is only found in time slot 0. The channel configurations for the control channels in GSM are described in detail in a document 3GPP TS 05.01, which is publicly available.

In GSM, the PCH is divided into N paging groups, where N is the number of paging blocks available in one CCCH. (A cell may have multiple CCCHs.) Each paging group includes one paging block for every n-th multiframe, where n is a fixed value that is specified by a parameter BS_PA_MFRMS and ranges from 2 through 9. Each idle mode terminal is assigned to a specific paging group, which is determined based on its International Mobile Subscriber Identity (IMSI) and the parameter N. Paging messages (if any) are sent to each terminal in its paging blocks, which are the m-th CCCH radio block of every n-th multiframe. The paging block index m is determined by the paging group and ranges from 0 through 8. An idle mode terminal typically only wakes up to receive paging messages sent in its paging blocks and "sleeps" the remainder of the time to conserve battery power.

When powered on or whenever coverage is lost, a terminal searches for suitable cells from which it may receive service. If a suitable cell is found and if the terminal is in the idle mode, then it camps on the cell and receives paging messages sent by this cell in its paging blocks. This cell is the terminal's current serving cell.

While in the idle mode, the terminal periodically checks to see if there is a better cell that it can camp on and receive service. To search for better cells, the terminal periodically measures the received signal levels of the serving cell as well as non-serving neighbor cells. The terminal typically makes these measurements during its paging blocks or shortly thereafter. These measurements are averaged and used along with other system parameters to compute two values, which are referred to as "C1" and "C2" in a pre-Release 1999 version of the GSM standard (i.e., a version earlier than Release 1999 version). The C1 and C2 values are used to determine whether a cell reselection is required and, if yes, to which new cell. In pre-Release 1999 version of the GSM standard, the terminal reselects a new cell if the received signal level for this cell is better than that of the current serving cell for at least five seconds. The terminal also reselects a new cell if the current serving cell becomes barred or unsuitable, can no longer be received, and so on. The computation of C1 and C2 is described in a document 3GPP TS 05.08, Section 6.4, and the events that trigger cell reselection are described in a document 3GPP TS 03.22, Section 4.5, both of which are publicly available. In Release 1999 version of the GSM standard (which includes advanced GSM/GPRS), the C1 and C2 values are replaced by C31 and C32 values, and a cell does not have to be better for 5 seconds to be selected. This is described in 3GPP TS 05.08, Section 10, of the Release 1999 version of GSM.

In GSM, the cells are grouped into location areas. A terminal is only required to register with a cell in a new location area, and is not required to register if it reselects a new cell within the same location area. All cells within the same location area broadcast paging messages for all terminals that have registered with the cells in that location area. In some GSM system deployments, a paging message for a terminal may be broadcast from cells in multiple location areas. This may be performed to improve the likelihood of the terminal receiving the paging message.

In GSM, the base stations for the cells are not synchronized and the timing of each base station is unlikely to be aligned with the timing of other base stations. The multiframe of each base station may thus start at any arbitrary point in time. Moreover, the cells within the same location area use different RF carriers and may define their paging groups differently. Thus, in order to receive paging messages from a new cell, a terminal would first "tune" to the cell to acquire the frequency and timing of the new cell. The terminal would then obtain pertinent system information for the new cell in order to process the paging channel for the cell, as described below.

Figure 3:
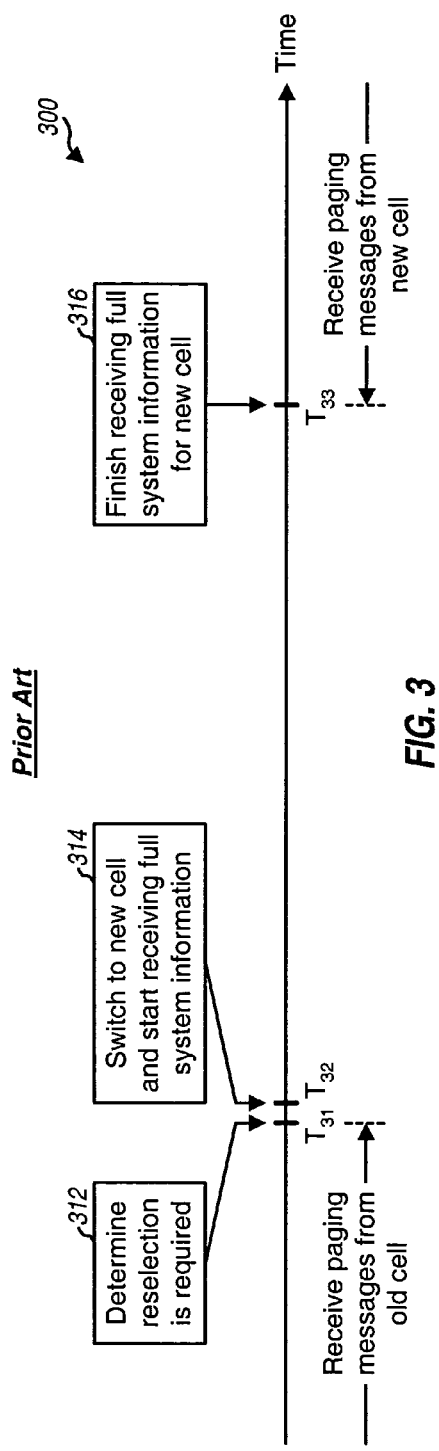
FIG. 3 shows a conventional method of performing cell reselection.

FIG. 3 shows a conventional method 300 of performing cell reselection and receiving paging messages by an idle mode terminal. Initially, the terminal receives paging messages from the current serving cell (i.e., the "old cell") in paging blocks for its paging group, which is assigned by the old cell. At time $T_{31}$, the terminal determines that a reselection to a new serving cell (i.e., the "new cell") is required (step 312). At time $T_{32}$, the terminal switches to the new cell and starts receiving full system information for the new cell, which is sent on the BCCH (step 314). Switching to the new cell entails tuning to the cell and performing other tasks needed to receive the cell. GSM requires the terminal to gather full system information in order to camp on the new cell. The gathering of the full system information can take from two to ten seconds, depending on various factors such as the rate at which the new cell transmits the system information. At time $T_{33}$, the terminal finishes receiving the full system information for the new cell and can now camp on this cell (step 316). The terminal thereafter receives paging messages from the new cell in paging blocks for its paging group, as assigned by the new cell.

As shown in FIG. 3, the terminal does not receive paging messages during the time period from $T_{31}$ to $T_{33}$. The terminal would miss paging messages sent to it during this time period and may thus miss incoming calls, which is highly undesirable.

Early Camping

To reduce the likelihood of missing pages during cell reselection, a terminal can start receiving paging messages from a new cell as soon as it obtains sufficient system information to process the paging channel for the new cell, instead of waiting until after full system information has been gathered. In GSM, the full system information is transmitted in pieces using different types of system information messages. Each system information message carries certain system information and is sent at specific times (i.e., known TDMA frames). Different system information messages are transmitted at different rates or intervals ranging from approximately once every second to once every ten seconds. A System Information Type 3 message ("SI3") carries information needed by a terminal to perform cell reselection and receive paging messages from a cell (e.g., to determine the paging blocks for the terminal, as assigned by the cell). SI3 may be sent at a rate of approximately once every second. A System Information Type 4 message ("SI4") carries information needed by a terminal to perform cell reselection but does not contain information necessary to receive paging messages. Full system information is transmitted in system information messages of types 1 through 20, which are not consecutively numbered (e.g., types 10, 11, 12, 14 and 15 are currently not used). A terminal is not permitted to transmit on the uplink to a cell until it has gathered the full system information for that cell, which can take from approximately one to ten seconds.

A terminal can perform early camping and start receiving paging message from a new cell after obtaining SI3 for the new cell. Since SI3 is sent more frequently than some other types of system information, the terminal can typically obtain SI3 much sooner than the full system information. The terminal can thus start receiving paging messages from the new cell earlier, which reduces the likelihood of missing a page.

Figure 4:
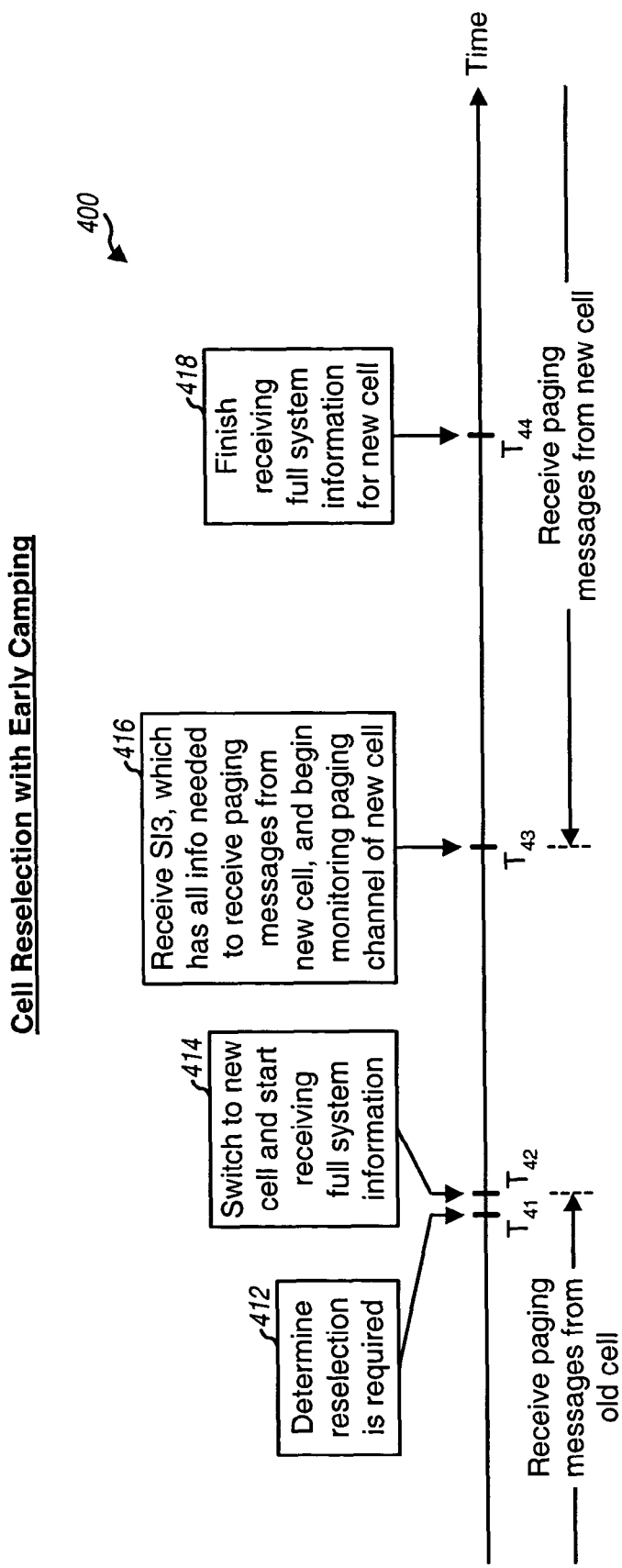
FIGS. 4 and 5 show methods of performing cell reselection with early camping.

FIG. 4 shows a method 400 of performing cell reselection with early camping. At time $T_{41}$, an idle mode terminal determines that a reselection to a new serving cell is required (step 412). At time $T_{42}$, the terminal switches to the new cell and starts receiving full system information for the new cell (step 414). At time $T_{43}$, the terminal receives System Information Type 3 message (SI3), which contains all of the information needed by the terminal to process the paging channel for the new cell (step 416). The terminal may then begin monitoring the paging channel for the new cell to receive paging messages. If the terminal receives a paging message from the new cell, then it can store the message because it is not yet able to transmit on the uplink to the new cell. At time $T_{44}$, the terminal finishes receiving the full system information for the new cell (step 418). The terminal can then (1) respond to paging messages (if any) received from the new cell since time $T_{43}$ or (2) continue to camp on the new cell if no actions are required. In any case, the terminal continues to receive paging messages from the new cell in its paging blocks, as assigned by the new cell.

As shown in FIG. 4, for method 400, the terminal does not receive paging messages during the time period from $T_{42}$ to $T_{43}$, which is the amount of time needed to obtain SI3. However, SI3 is sent more often than some other types of system information and can be obtained within a shorter time period than that needed to obtain the full system information. Thus, the time period in which the terminal may miss paging messages is reduced in comparison to method 300 in FIG. 3. With method 400, the terminal does not miss paging messages sent during the time period from $T_{43}$ to $T_{44}$.

Method 400 may be used for "normal reselection", which is reselection to a new cell that is better than the current serving cell. Method 400 may also be used for "immediate reselection", which is reselection to a new cell because the current serving cell has become unsuitable and the terminal can no longer camp on it. The current serving cell becomes unsuitable if, for example, the channel condition goes bad, the cell is barred, and so on. For both normal and immediate reselection with early camping, the terminal switches to the new cell and starts receiving paging messages from this cell upon obtaining SI3.

Figure 5:
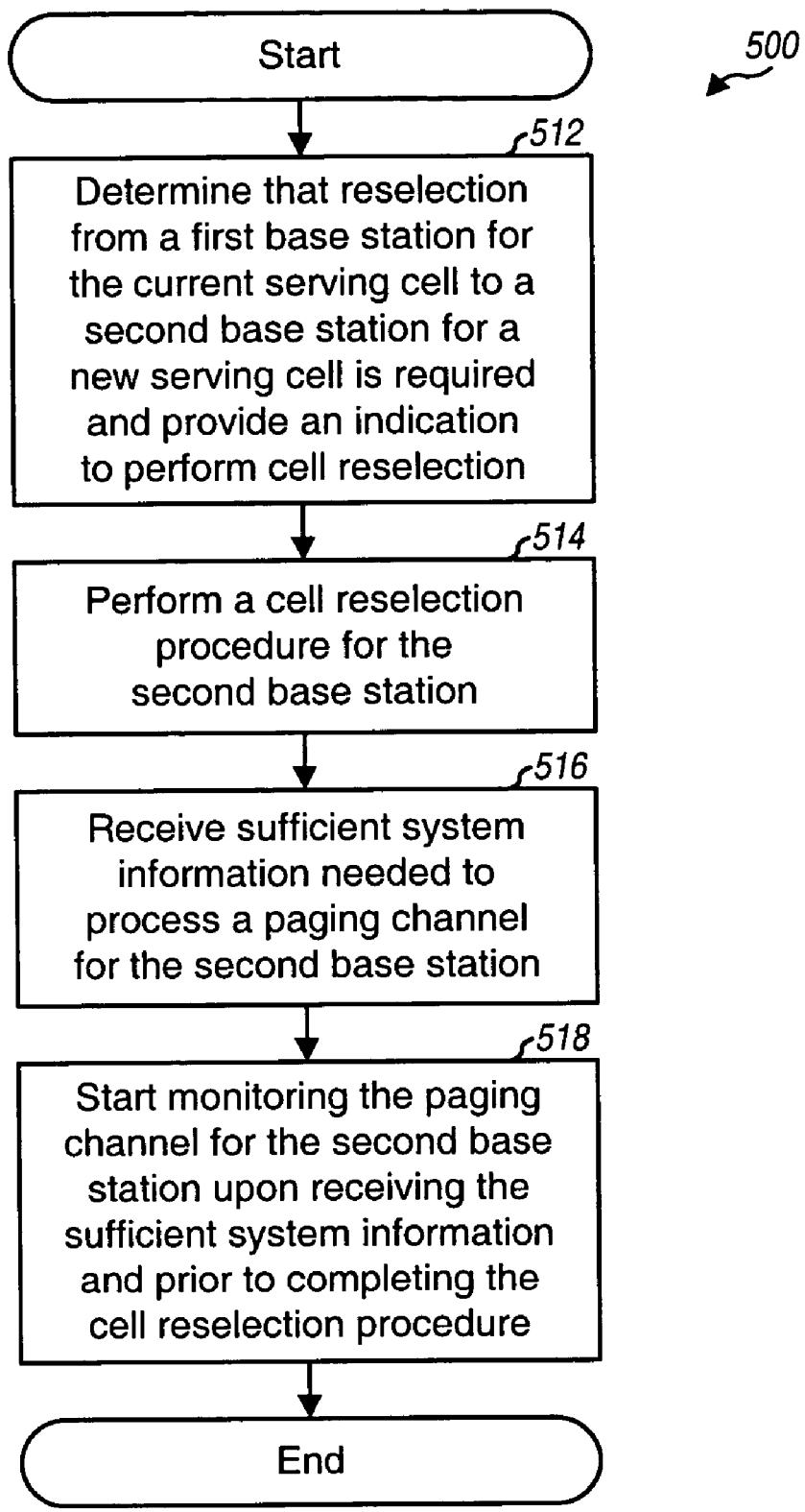

FIG. 5 shows a flow diagram of a method 500 of performing cell reselection with early camping. Initially, the terminal determines that reselection from a first base station for the current serving cell (i.e., the old cell) to a second base station for the new serving cell (i.e., the new cell) is required (step 512). For GSM, this determination may be made based on (1) measurements of received signal level for the current serving cell and neighbor cells and (2) reselection parameters included in the system information. The terminal then performs a cell reselection procedure for the second base station (step 514). The cell reselection procedure can include different tasks for different systems. For GSM, the cell reselection procedure includes receiving full system information for the new cell. The terminal receives sufficient system information to process a paging channel for the second base station (step 516). For GSM, the sufficient system information is carried in SI3. The terminal starts monitoring the paging channel upon receiving the sufficient system information and prior to completing the cell reselection procedure (step 518).

The terminal may receive a paging message on the paging channel for the second base station prior to completing the cell reselection procedure. The terminal may store the paging message and respond to the page via the second base station after completing the cell reselection procedure. Alternatively, the terminal may abort the cell reselection procedure and respond to the page via the first base station.

Reconfirmation Prior to Cell Reselection

While camped on a serving cell, a terminal decodes the BCCH of the serving cell to obtain full system information every 30 seconds. The terminal also monitors neighbor cells for possible reselection to these cells. For each neighbor cell to be monitored, the terminal first tunes to the RF carrier of the neighbor cell and then acquires the FCCH of the cell, which provides the frequency and timing of the cell. The terminal typically only needs to do this acquisition once, which is the first time the terminal tunes to the neighbor cell. Thereafter, the terminal periodically receives and decodes the SCH of each neighbor cell to obtain a base station ID code (BSIC) for the cell. GSM requires the terminal to obtain the BSIC every 30 seconds to ensure that it is still listening to the same neighbor cell. The terminal also receives and decodes the BCCH of each neighbor cell to obtain SI3 every 5 minutes, as required by GSM. The updated SI3 is needed to ensure that parameters affecting cell reselection for the terminal's six strongest neighbor cells have not changed. The terminal thus decodes the SCH every 30 seconds and the BCCH every 5 minutes for each neighbor cell being monitored.

The coding scheme used for the FCCH and SCH is different from the coding scheme used for the BCCH. Thus, it is possible for a terminal to be able to decode the FCCH and SCH but not the BCCH. If such is the case, then a terminal performing cell reselection may tune to the new cell and spend some amount of time (e.g., up to ten seconds) trying to decode the BCCH for the new cell before realizing that this is not possible. During this time, the terminal would miss any paging message sent to it.

To reduce the likelihood of missing pages during cell reselection, a terminal can perform a "reconfirmation" to ensure that the BCCH of a new cell can be decoded before performing the reselection to that cell. For the reconfirmation, the terminal receives and decodes the BCCH of the new cell as background tasks while performing other actions (e.g., receive paging messages) for the current serving cell as foreground tasks. The terminal can typically perform both foreground and background tasks in a time division multiplexed (TDM) manner. The foreground tasks have higher priority and are performed first, and the background tasks have lower priority and are performed second. However, since the cells are not operated synchronously in GSM, it is possible for the foreground tasks to overlap time-wise with the background tasks. If such a time conflict arises, then the terminal would perform the foreground tasks since these take precedence and would forego the background tasks. In any case, the reconfirmation avoids the scenario whereby the terminal (1) performs reselection to the new cell but is not able to receive the BCCH and (2) misses paging messages sent to it during this time period.

One goal of reconfirmation is to ensure that the terminal can decode the BCCH of the new cell before performing reselection to the new cell. To achieve this goal, the terminal can receive and decode any of the system information messages sent on the BCCH by the new cell. An additional goal of reconfirmation may be to gather SI3 or SI4 for the new cell prior to performing the reselection. Both SI3 and SI4 contain sufficient information to allow the terminal to verify that the new cell is selected in accordance with up-to-date parameters. SI3 further allows the terminal to start receiving paging messages from the new cell as soon as the cell reselection procedure is initiated. For the embodiments described below, the terminal obtains either SI3 or SI4 for reconfirmation. For other embodiments, the terminal may obtain other types of system information for reconfirmation.

Figure 6:
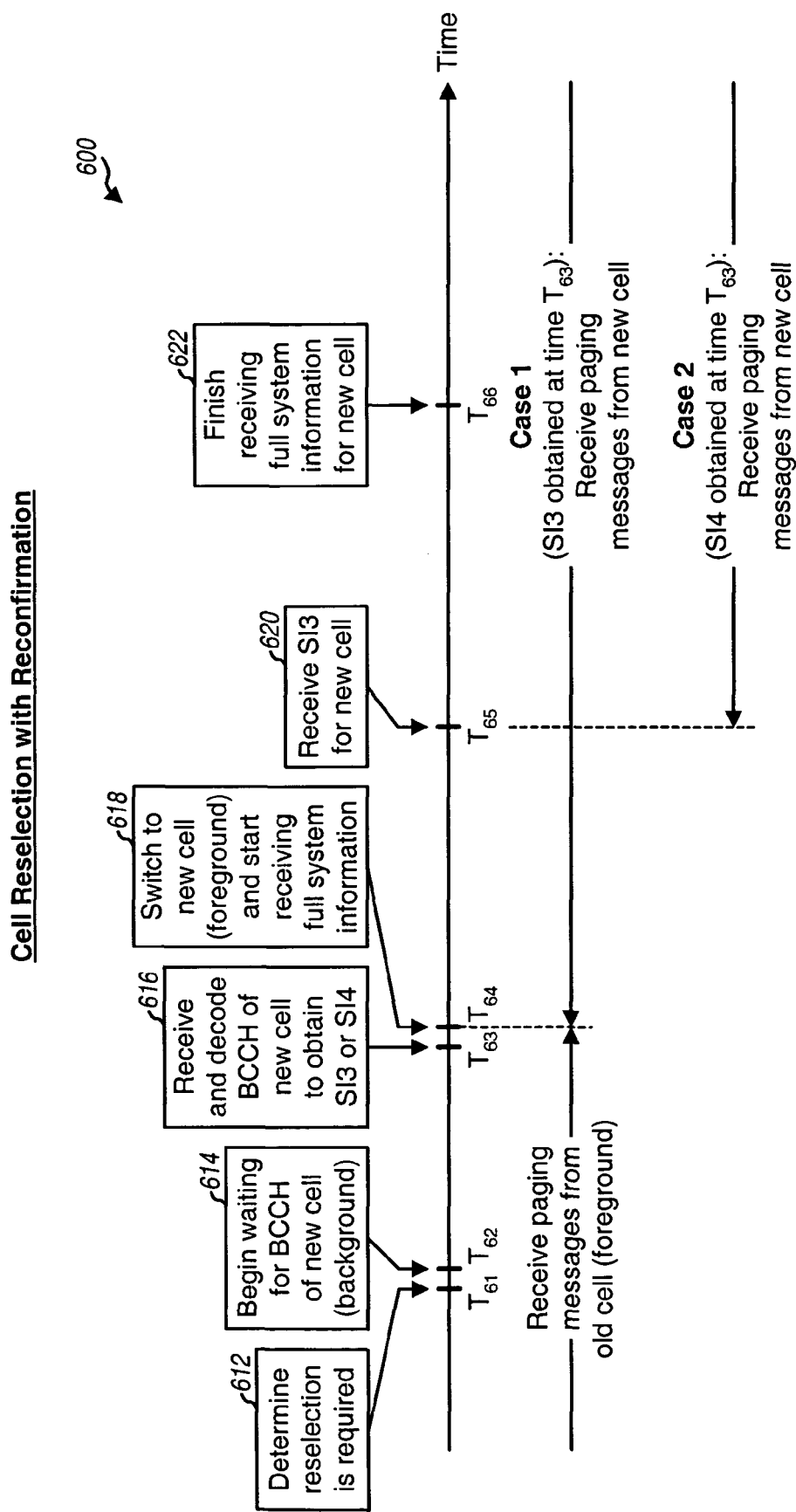
FIGS. 6 and 7 show methods of performing cell reselection with reconfirmation.

FIG. 6 shows a method 600 of performing reconfirmation prior to cell reselection. At time $T_{61}$, the terminal determines that a reselection to a new serving cell is required (step 612). However, unlike the methods in FIGS. 3 and 4, the terminal does not immediately perform reselection to the new cell. Instead, the terminal performs reconfirmation for the new cell and begins waiting for the BCCH of the new cell at time $T_{62}$ (step 614). The reconfirmation is performed as background tasks. While the terminal is waiting for the BCCH of the new cell, it continues to receive paging messages from the current serving cell (i.e., the old cell) as foreground tasks.

At time $T_{63}$, the terminal receives and decodes the BCCH of the new cell and obtains SI3 or SI4 (step 616). After successfully decoding the BCCH, the terminal switches to the new cell at time $T_{64}$, performs the reselection procedure, and starts receiving full system information for the new cell (step 618). At the time the terminal reselects or switches to the new cell, the tasks for the new cell become foreground. Thus, prior to time $T_{64}$, the terminal receives (1) paging messages from the old cell as foreground tasks and (2) SI3 or SI4 from the BCCH of the new cell as background tasks. After time $T_{64}$, the terminal receives full system information for the new cell as foreground tasks.

For case 1 in FIG. 6, the terminal obtains SI3 for the reconfirmation and starts receiving paging messages from the new cell at time $T_{64}$. For this case, the terminal may miss a paging message only during the time it takes to tune to the new cell. For case 2 in FIG. 6, the terminal obtains SI4 for the reconfirmation and does not have enough information to immediately receive paging messages from the new cell at time $T_{64}$. In the process of gathering full system information, the terminal obtains SI3 for the new cell at time $T_{65}$ (step 620) and can thereafter receive paging messages from the new cell. For both cases 1 and 2, the terminal finishes receiving the full system information for the new cell at time $T_{66}$ (step 622). The terminal can then respond to any paging message received prior to time $T_{66}$. If no action is required, then the terminal can continue to camp on the new cell and receive paging messages in its paging blocks, as assigned by the new cell.

As shown in FIG. 6, for method 600, the period of time that the terminal may miss a page is reduced to almost zero if SI3 is obtained during the reconfirmation. If SI3 is obtained during the gathering of the full system information, then the terminal does not receive paging messages during the time period from $T_{64}$ to $T_{65}$. This time period is typically much shorter than that needed to obtain the full system information, as noted above.

A terminal may skip the reconfirmation for the new cell when performing immediate reselection. For immediate reselection, the terminal does not attempt to receive paging messages from the old cell, immediately switches to the new cell, and starts receiving paging messages from the new cell upon obtaining SI3.

Figure 7:
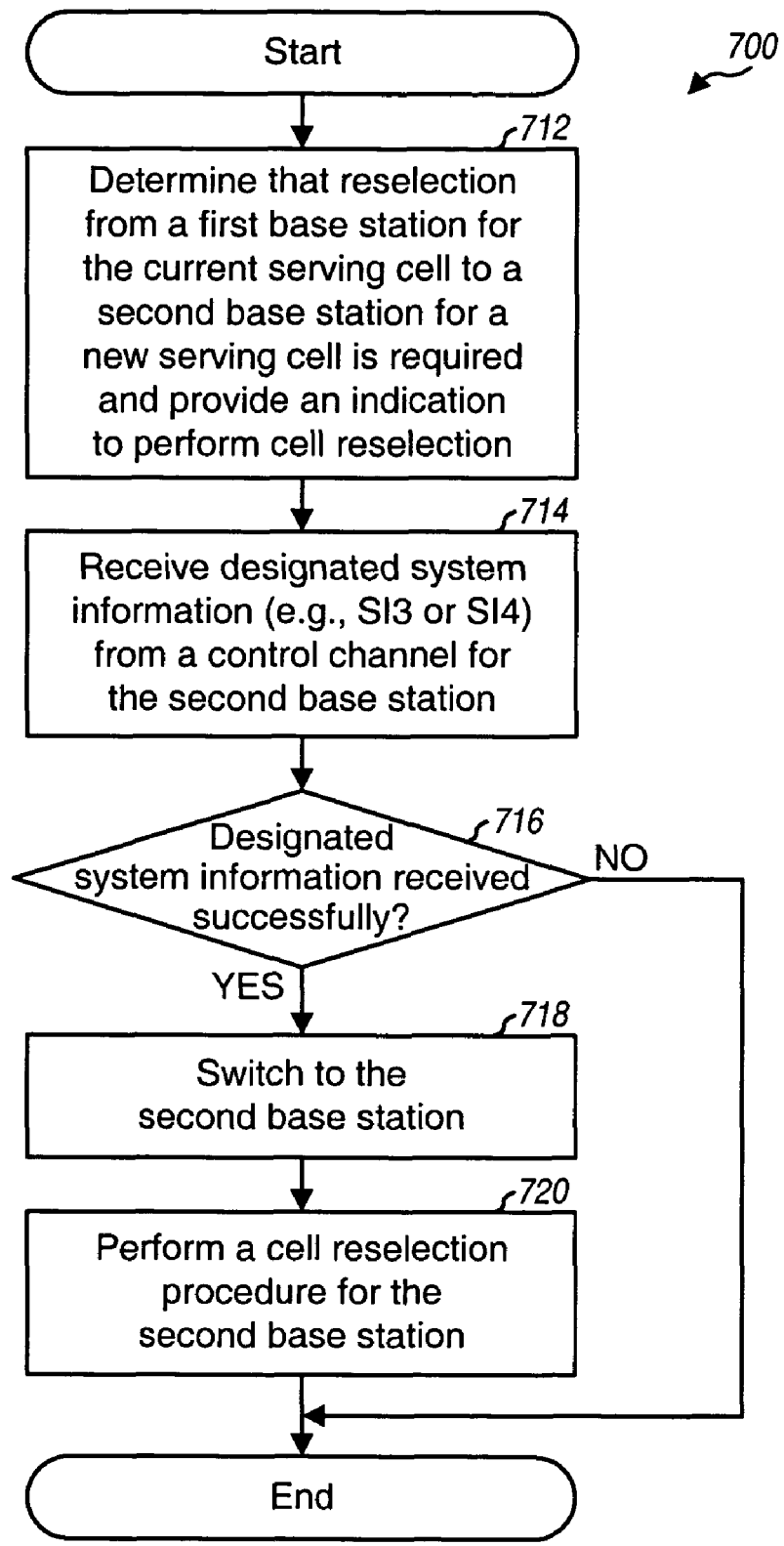

FIG. 7 shows a flow diagram of a method 700 of performing reconfirmation prior to cell reselection. Initially, the terminal determines that reselection from a first base station for the current serving cell to a second base station for the new serving cell is required (step 712). The terminal then receives and decodes designated system information from a control channel for the second base station (step 714). The reception of the designated system information is to reconfirm the reselection to the second base station. Different types of designated system information may be received for different systems. For GSM, the designated system information may be SI3 or SI4. A determination is then made whether or not the designated system information has been received and decoded successfully (step 716). If the answer is 'no', then the terminal skips the reselection. Otherwise, the terminal switches to the second base station (step 718) and performs a cell reselection procedure for the second base station (step 720). The terminal may receive paging messages from the paging channel for the second base station as soon as it obtains sufficient system information to process this paging channel.

Overlapping Page Reception

For methods 300, 400, and 600 shown in FIGS. 3, 4, and 6, respectively, the terminal receives paging messages from at most one cell at any given moment. For these methods, there may be a period of time during which the terminal does not receive paging messages from any cell.

To further reduce the likelihood of missing pages during cell reselection, a terminal can receive paging messages from both the old and new cells and for all or a portion of the time during the cell reselection. The overlap in the reception of paging messages from multiple cells can provide certain advantages, as described below. The overlapping page reception may be implemented with or without the early camping and/or reconfirmation described above.

Figure 8:
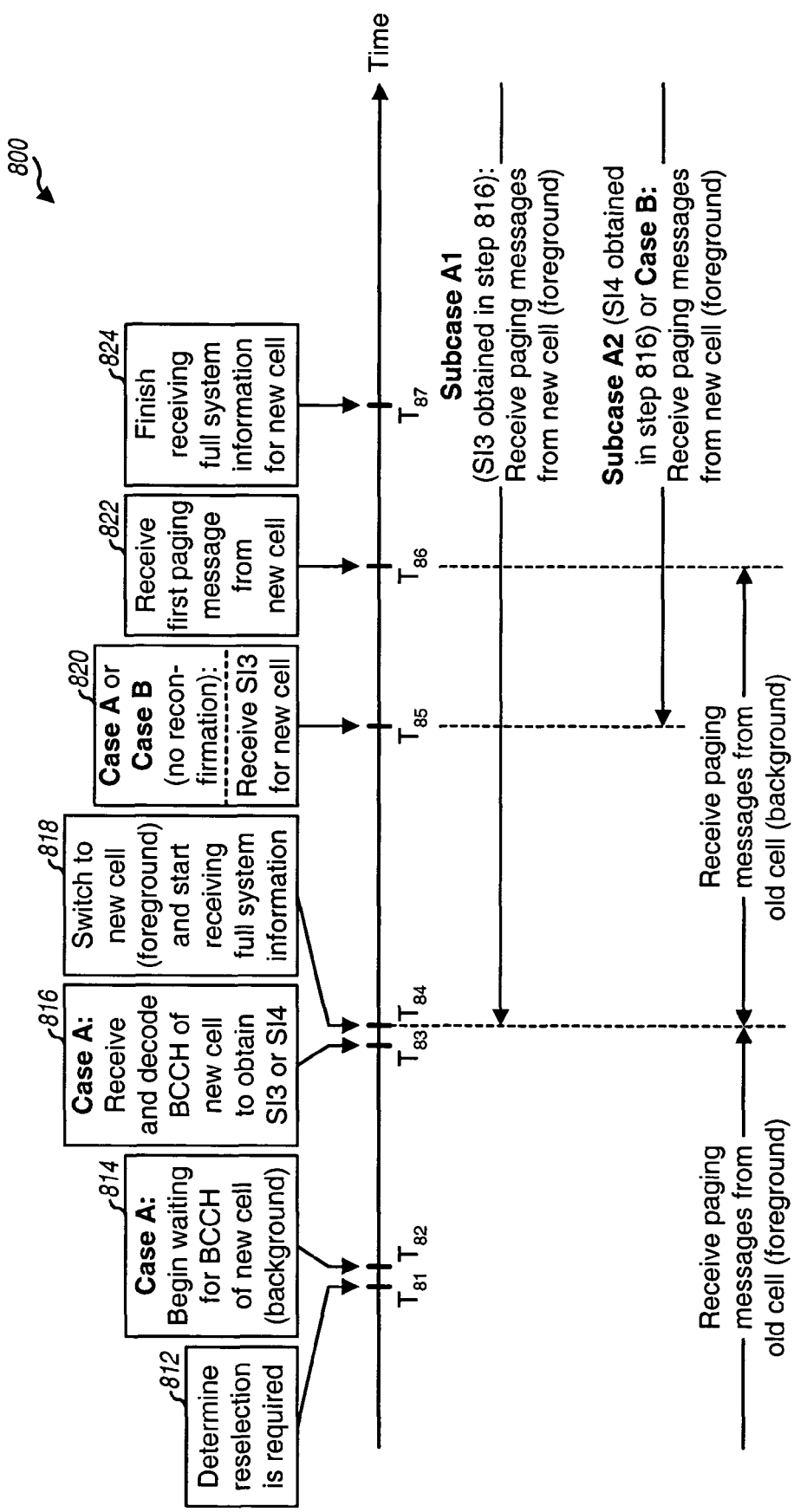
FIGS. 8, 9, and 10 show methods of performing cell reselection with overlapping page reception.

FIG. 8 shows a method 800 of performing cell reselection with overlapping page reception. At time $T_{81}$, the terminal determines that a reselection to a new serving cell is required (step 812). The subsequent actions by the terminal are dependent on whether or not reconfirmation is performed.

For case A in FIG. 8, the terminal performs reconfirmation of the new cell. The terminal begins waiting for the BCCH of the new cell at time $T_{82}$ (step 814). At time $T_{83}$, the terminal receives and decodes the BCCH of the new cell and obtains SI3 or SI4 (step 816). After successfully decoding the BCCH, the terminal switches to the new cell at time $T_{84}$, performs reselection, and starts receiving full system information for the new cell (step 818). If the terminal obtains SI3 for the reconfirmation (subcase A1), then it can start receiving paging messages from the new cell at time $T_{84}$. If the terminal obtains SI4 for the reconfirmation (subcase A2), then it can start receiving paging messages from the new cell at time $T_{85}$, which is when it obtains SI3 for the new cell (step 820). Regardless of when it may have started monitoring the paging channel for the new cell, the terminal receives the first paging message from the new cell at time $T_{86}$ (step 822). This paging message is sent in a paging block for the terminal but may or may not be addressed to the terminal. At time $T_{87}$, the terminal finishes receiving the full system information for the new cell (step 824).

For case A in FIG. 8, prior to time $T_{84}$, the terminal receives (1) paging messages from the old cell as foreground tasks and (2) SI3 or SI4 from the new cell as background tasks. From times $T_{84}$ to $T_{86}$, the terminal continues to receive paging messages from the old cell as background tasks. For subcase A1, the terminal can receive (1) paging messages from the new cell as foreground tasks starting at time $T_{84}$ and (2) paging messages from both the old and new cells between times $T_{84}$ to $T_{86}$. For subcase A2, the terminal can receive (1) paging messages from the new cell as foreground tasks starting at time $T_{85}$ and (2) paging messages from both the old and new cells between times $T_{85}$ to $T_{86}$. For case A in FIG. 8, there is an overlap in the reception of paging messages from both cells starting at time $T_{84}$ or $T_{85}$ (which is when SI3 is obtained) to time $T_{86}$ (which is when the first paging message is received from the new cell).

For case B in FIG. 8, the terminal does not perform reconfirmation of the new cell. For this case, the terminal does not need to wait for the BCCH of the new cell (i.e., steps 814 and 816 are omitted) after determining that cell reselection is required and can immediately switch to the new cell and start receiving full system information (step 818). Thus, the time gap between $T_{81}$ and $T_{84}$ is smaller for case B than case A. At time $T_{85}$, the terminal receives and decodes the BCCH of the new cell and obtains SI3 (step 820). The terminal can then perform early camping and start receiving paging messages from the new cell at time $T_{85}$. The terminal receives the first paging message from the new cell at time $T_{86}$ (step 822) and finishes receiving the full system information for the new cell at time $T_{87}$ (step 824). The terminal receives paging messages from both the old and new cells between times $T_{85}$ to $T_{86}$.

As shown in FIG. 8, for method 800, the period of time that the terminal may miss a page is reduced to almost zero (which may be the amount of time required to tune to the new cell). The overlap in the reception of paging messages from both cells improves the likelihood of the terminal receiving paging messages from at least one of the cells during reselection.

In method 800, during the time period from $T_{84}$ to $T_{87}$ when cell reselection is performed, the terminal may receive a paging message from the old cell, a paging message from the new cell, or paging messages from both the old and new cells. If the terminal has not changed location area, which can be ascertained based on the system information obtained for the new cell, then the same paging messages are broadcast by both the old and new cells. In this case, it may be better for the terminal to answer the page on the new cell, which is better than the old cell. The terminal can store all of the received paging messages until it has gathered the full system information for the new cell. The terminal can then transmit on the uplink to the new cell and respond to pages. Alternatively, upon receiving a paging message from the old or new cell, the terminal can abort the cell reselection, return to the old cell, and answer the page via the old cell. The terminal may thereafter restart the reselection procedure if appropriate. For immediate reselection, the terminal responds to all pages via the new cell since the old cell is no longer suitable.

For method 800, the terminal stops receiving paging messages from the old cell once it successfully receives the first paging message from the new cell. If the old and new cells are in the same location area, then the same paging messages are sent to the terminal by both cells, and the terminal only needs to receive these messages from one of the cells. In other embodiments, the terminal may continue to receive paging messages from the old cell until some other terminating event occurs (e.g., reception of full system information, successful transmission to the new cell, and so on).

Figure 9:
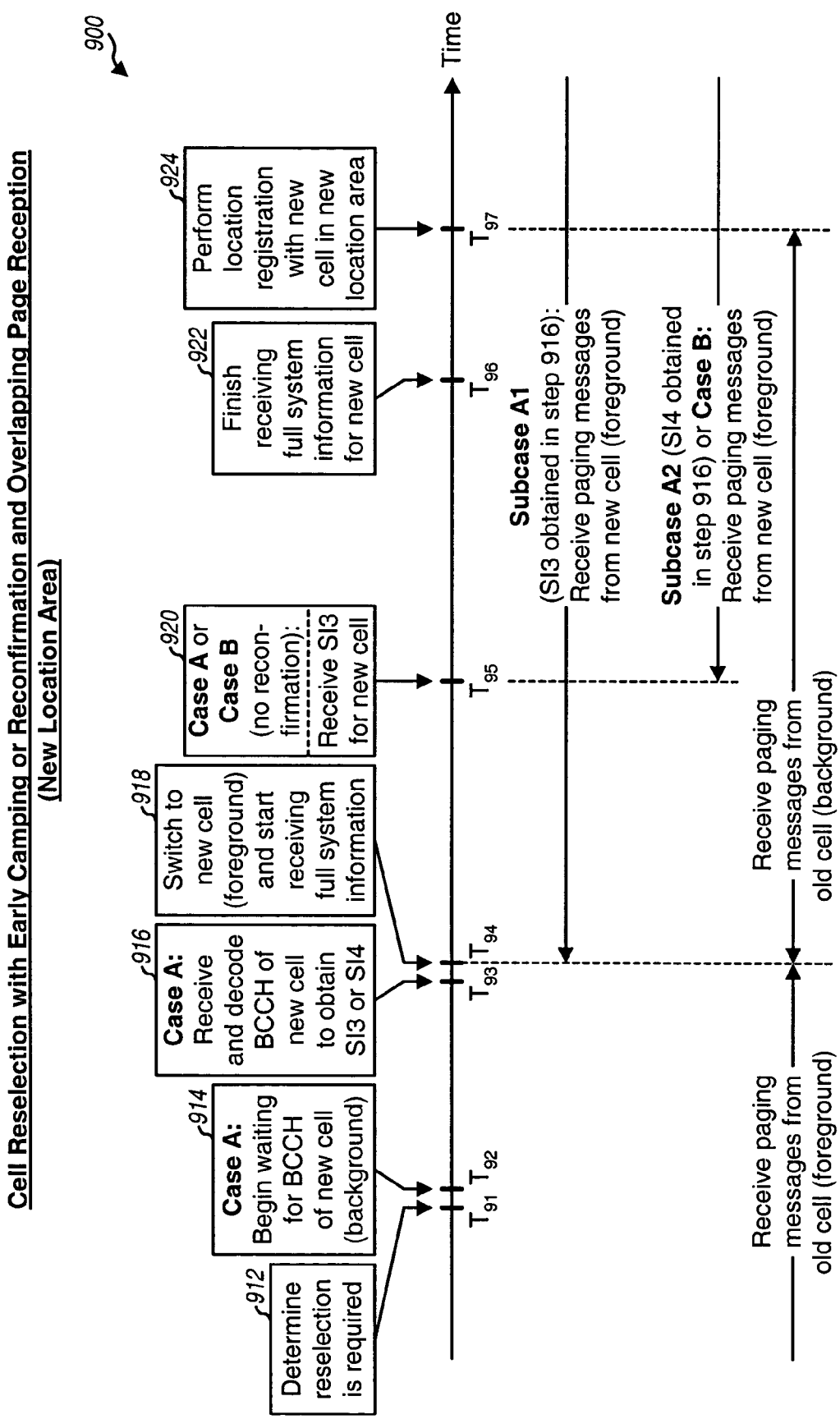

FIG. 9 shows a method 900 of performing cell reselection to a cell in a new location area with overlapping page reception. Method 900 is similar to method 800 in FIG. 8 in that the terminal (1) determines that a reselection to a new serving cell is required at time $T_{91}$ (step 912), (2) performs reconfirmation of the new cell and begins waiting for the BCCH of the new cell time at time $T_{92}$ (step 914), (3) receives and decodes the BCCH of the new cell and obtains SI3 or SI4 at time $T_{93}$ (step 916), (4) switches to the new cell at time $T_{94}$ and starts receiving full system information for the new cell (step 918), and (5) finishes receiving the full system information for the new cell at time $T_{96}$ (step 922). Method 900 is different from method 800 in that the terminal determines that it has moved into a new location area based on the system information received from the new cell. As a result, after receiving the full system information, the terminal performs location registration with the new cell at time $T_{97}$ (step 924).

For case A in FIG. 9, the terminal performs reconfirmation of the new cell and obtains SI3 or SI4 for the reconfirmation. If the terminal obtains SI3 for the reconfirmation (subcase A1), then it starts receiving paging messages from the new cell at time $T_{94}$. If the terminal obtains SI4 for the reconfirmation (subcase A2), then it starts receiving paging messages from the new cell at time $T_{95}$, which is when it obtains SI3. The terminal receives paging messages from the old cell as foreground tasks prior to time $T_{94}$ and continues to receive paging messages from the old cell as background tasks from times $T_{94}$ to $T_{97}$. For subcase A1, the terminal receives (1) paging messages from the new cell as foreground tasks starting at time $T_{94}$ and (2) paging messages from both the old and new cells between times $T_{94}$ to $T_{97}$. For subcase A2, the terminal receives (1) paging messages from the new cell as foreground tasks starting at time $T_{95}$ and (2) paging messages from both the old and new cells between times $T_{95}$ to $T_{97}$. For case A in FIG. 9, there is an overlap in the reception of paging messages from both cells starting at time $T_{94}$ or $T_{95}$ (which is when SI3 is obtained) to time $T_{97}$ (which is when location registration is performed with the new cell).

For case B in FIG. 9, the terminal does not perform reconfirmation of the new cell. At time $T_{95}$, the terminal receives and decodes the BCCH of the new cell and obtains SI3, performs early camping, and starts receiving paging messages from the new cell. The terminal receives paging messages from the old cell as foreground tasks prior to time $T_{94}$ and as background tasks from time $T_{94}$ to $T_{97}$. The terminal receives paging messages from both cells between times $T_{95}$ to $T_{97}$.

In method 900, during the time period from $T_{94}$ to $T_{97}$ when cell reselection and location registration are performed, the terminal may start receiving paging messages from both the old and new cells as soon as SI3 is obtained. Even if the terminal has changed location area, it may still be beneficial to receive paging messages from the new cell in the new location area since the system may broadcast paging messages from multiple location areas. During the time from $T_{94}$ to $T_{97}$, the terminal may receive a paging message from the old cell, a paging message from the new cell, or paging messages from both the old and new cells. If a paging message is received from any of the cells, then it may be better for the terminal to abort the cell reselection and answer the page on the old cell. This is because the terminal may or may not be able to communicate with the new cell even though the received signal level for the new cell may be higher. Alternatively, the terminal can store the paging message until it has received the full system information and performed location registration with the new cell. The terminal can then transmit on the uplink and respond to the page via the new cell. For immediate reselection, the terminal responds to all pages via the new cell since the old cell is no longer suitable.

For method 900, the terminal stops receiving paging messages from the old cell once it performs location registration with the new cell in the new location area (instead of upon receiving the first paging message from the new cell). Since the old and new cells are in different location areas, the terminal can communicate with the new cell only after performing the location registration. In other embodiments, the terminal may receive paging messages from the old cell until some other terminating event occurs (e.g., reception of the first paging message from the new cell, reception of enough system information for the new cell to gain confidence that communication with the new cell is possible, and so on).

For both methods 800 and 900, the terminal receives paging messages from both the old and new cells for all or a portion of the time during cell reselection. This overlapping reception of paging messages is possible if the paging blocks for the old cell and the paging blocks for the new cell do not overlap in time, which is the likely scenario. However, the paging blocks for the two cells may overlap and a time conflict may arise. In this case, in one embodiment, the terminal receives the paging messages from the new cell and foregoes the paging messages from the old cell. In another embodiment, the terminal receives the paging messages from the old cell and foregoes the paging messages from the new cell.

Figure 10:
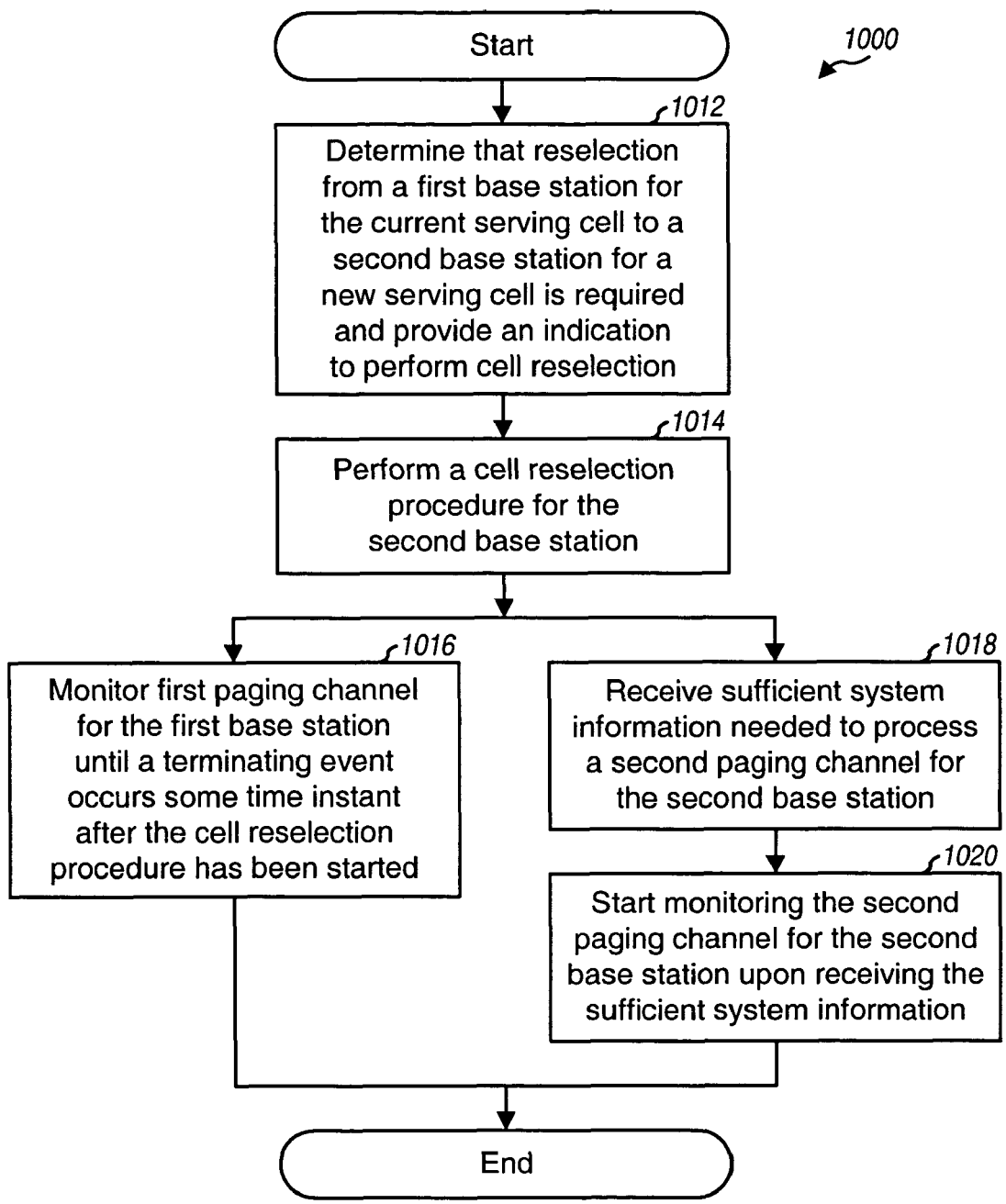

FIG. 10 shows a flow diagram of a method 1000 of performing cell reselection with overlapping page reception. Initially, the terminal determines that reselection from a first base station for the current serving cell to a second base station for the new serving cell is required (step 1012). The terminal then performs a cell reselection procedure for the second base station (step 1014). The terminal monitors the paging channel for the first base station until a terminating event occurs at some time instant after the cell reselection procedure has been initiated (step 1016). The terminating event may be (1) reception of the first paging message on the paging channel for the second base station (e.g., if the old and new cells are in the same location area), (2) registration with the second base station (e.g., if the old and new cells are in different location areas), or (3) some other event. The terminal receives sufficient system information to process the paging channel for the second base station during the cell reselection procedure (step 1018) and starts monitoring this paging channel upon receiving the sufficient system information (step 1020). The monitoring of the paging channel for the first base station and the monitoring of the paging channel for the second base station overlap in time. This is indicated by the two parallel paths in the flow diagram—one path for step 1016 for the old cell and another path for steps 1018 and 1020 for the new cell.

System

Figure 11:
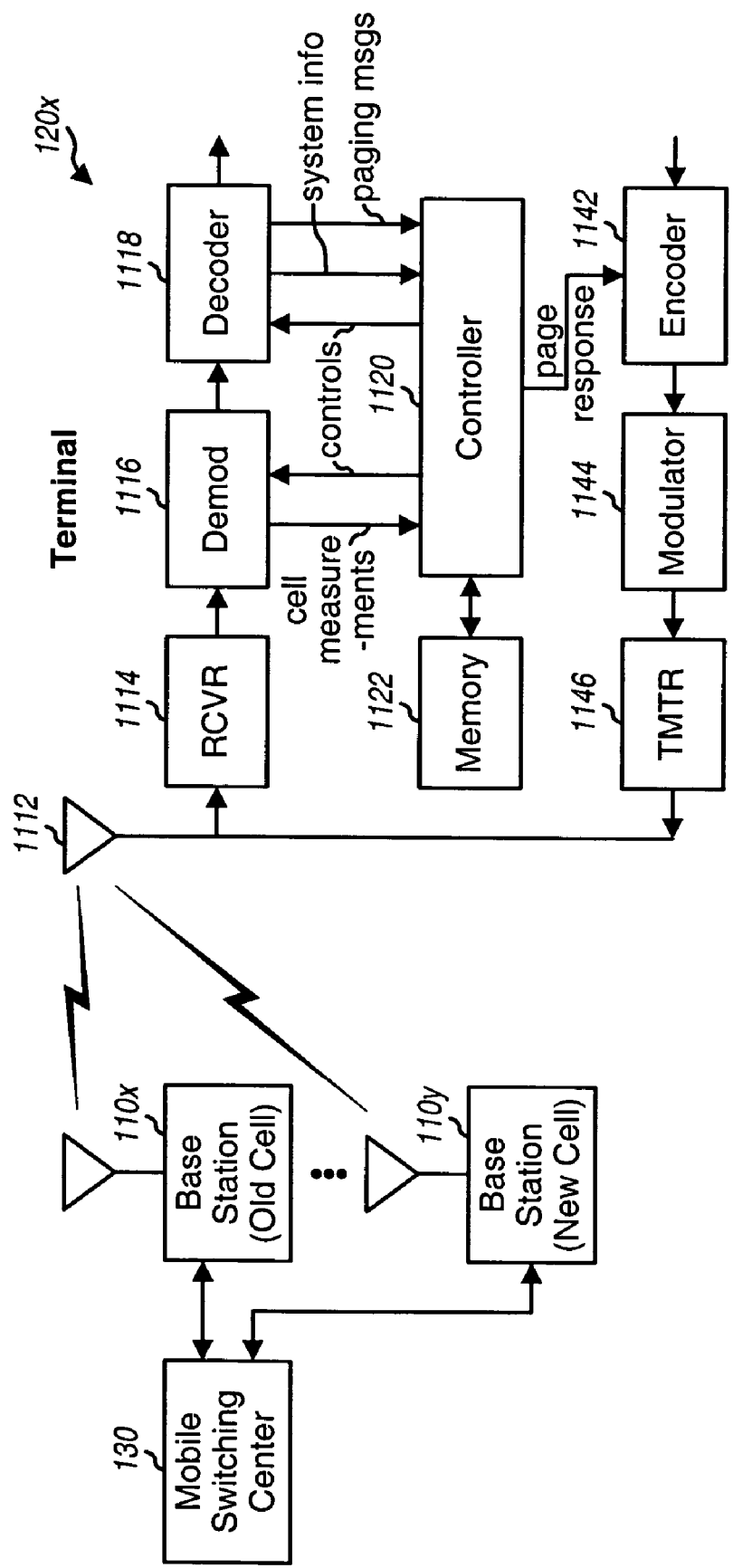
FIG. 11 shows a block diagram of a terminal.

FIG. 11 shows a block diagram of a terminal 120x capable of performing the cell reselection techniques described herein. Terminal 120x is one of the terminals in FIG. 1. Base station 110x is for the current serving cell of terminal 120x, and base station 110y is for the new serving cell. Base stations 110x and 110y are two of the base stations in FIG. 1 and may belong in the same or different location areas.

On the downlink, terminal 120x receives downlink signals transmitted from various base stations in the system, including base stations 110x and/or 110y. The received signal at an antenna 1112 is provided to a receiver unit (RCVR) 1114 and conditioned and digitized to obtain data samples. A demodulator (Demod) 1116 then demodulates the data samples in accordance with GSM to obtain demodulated data. A decoder 1118 further decodes the demodulated data in accordance with GSM to obtain decoded data, which may include system information and/or paging messages transmitted by base stations 110x and/or 110y. The system information and/or paging messages may be provided to a controller 1120 and/or a memory unit 1122.

On the uplink, terminal 120x may transmit data and messages (e.g., for answering a page, registering with a new cell in a new location area, and so on) to base station 110x and/or base station 10y. An encoder 1142 receives, formats, and encodes the data/messages. The coded data/messages are then modulated by a modulator 1144 and further conditioned by a transmitter unit (TMTR) 1146 to obtain an uplink signal, which is transmitted to base stations 110x and/or 110y. Each of the recipient base station(s) receives and processes the uplink signal to recover the data/messages sent by the terminal, and may forward the messages to mobile switching center (MSC) 130 for further processing.

Controller 1120 directs the operation of various processing units within terminal 120x. For example, controller 1120 may direct and/or perform the processing for cell reselection, paging channel monitoring, page response, and so on. Memory unit 1122 provides storage for program codes and data used by controller 1120.

Figure 12:
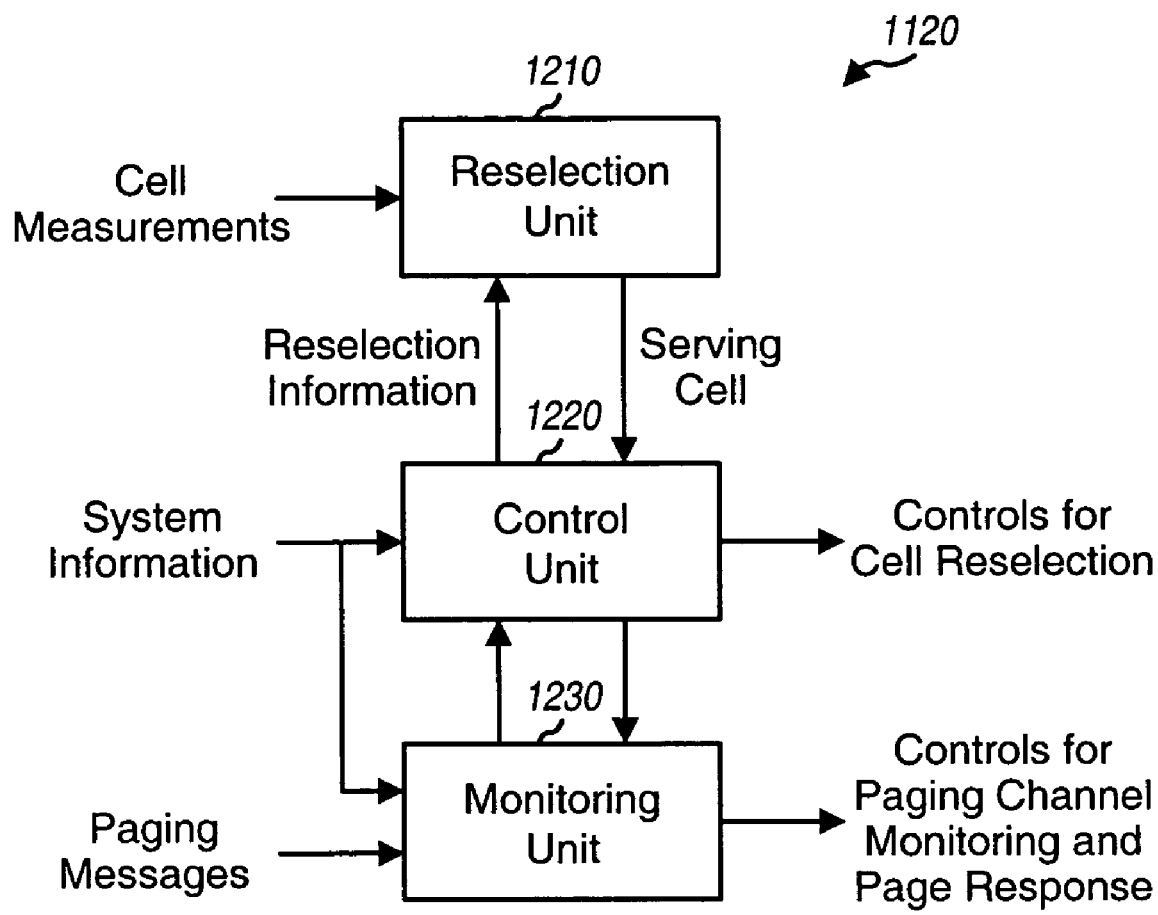
FIG. 12 shows a block diagram of a controller within the terminal.

FIG. 12 shows a block diagram of an embodiment of controller 1120. For this embodiment, controller 1120 includes a reselection unit 1210, a control unit 1220, and a monitoring unit 1230.

Reselection unit 1210 receives various types of information used to select the serving cell for terminal 120x. Such information includes (1) measurements of the received signal levels for the serving and non-serving cells (i.e., cell measurements), (2) parameters for cell reselection (i.e., reselection information), and (3) possibly other information. Reselection unit 1210 computes the C1 and C2 values based on the received information and as defined by GSM, selects the best cell to camp on based on the C1 and C2 values, and provides the identity of the serving cell.

Control unit 1220 receives various types of information used for cell reselection. Such information includes (1) the new serving cell selected by reselection unit 1210, (2) indication of paging messages received during cell reselection, which is provided by monitoring unit 1230, and (3) possibly other information. Control unit 1220 provides various controls for the cell reselection to the new serving cell. For example, these controls may direct demodulator 1116 and decoder 1118 to gather full system information for the new serving cell.

Monitoring unit 1230 receives various types of information used for paging channel monitoring and page response. Such information includes (1) the new serving cell selected by reselection unit 1210, (2) sufficient system information to process the paging channel for the new cell (e.g., SI3), (3) indication of various events affecting the paging channel monitoring (e.g., reception of full system information for the new cell, registration with the new cell, and so on), and (4) possibly other information. Monitoring unit 1230 provides various controls to monitor the paging channels of the old and/or new serving cells, respond to received pages, and so on. For example, these controls may (1) direct demodulator 1116 and decoder 1118 to process paging channels for the old and/or new cells and (2) direct encoder 1142 and modulator 1144 to send a page response to the old cell or the new cell.

For clarity, the techniques for cell reselection with early camping, reconfirmation, and overlapping page reception have been described specifically for GSM. These techniques may also be used for other wireless communication systems such as, for example, CDMA systems.

The techniques described herein may be implemented by various means. For example, these techniques may be implemented in hardware, software, or a combination thereof. For a hardware implementation, the elements used to support cell reselection with early camping, reconfirmation, and/or overlapping page reception (e.g., reselection unit 1210, control unit 1220, and monitoring unit 1230 in FIG. 12) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 1122 in FIG. 11) and executed by a processor (e.g., controller 1120). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device in a wireless communication system, comprising:
   a reselection unit operative to provide an indication to perform cell reselection from a first base station to a second base station;
   a control unit operative to initiate a cell reselection procedure for the second base station in response to the indication from the reselection unit, wherein the first base station is a current serving cell and the cell reselection procedure selects the second base station as a new serving cell; and a monitoring unit operative to receive from a broadcast channel of the second base station sufficient system information to process a paging channel of the second base station, to determine which particular time intervals are assigned to the device for the paging channel based on the sufficient system information, to start monitoring the paging channel upon reception of the sufficient system information from the second base station and prior to completion of the cell reselection procedure, and to monitor the paging channel during the time intervals assigned to the device to detect for paging messages sent by the second base station to the device;

whereby the device performs an early camping operation which reduces a time gap for receiving paging messages from the second base station during cell reselection;

wherein the sufficient system information is System Information Type 3 in a Global System for Mobile Communications (GSM) system.

2. The device of claim 1, wherein the control unit is operative to direct reception of full system information for the second base station in order to complete the cell reselection procedure and for two-way communication with the second base station.

3. The device of claim 1, wherein the monitoring unit is operative to receive a paging message on the paging channel of the second base station prior to completion of the cell reselection procedure and to respond to the paging message via the second base station after completion of the cell reselection procedure.

4. The device of claim 1, wherein the monitoring unit is operative to receive a paging message on the paging channel of the second base station prior to completion of the cell reselection procedure, abort the cell reselection procedure, and respond to the paging message via the first base station.

5. The device of claim 1, wherein the cell reselection procedure is initiated when the device is in an idle mode.

6. The device of claim 1, wherein no transmissions are sent to the first or second base station for the cell reselection procedure.

7. The device of claim 1, wherein the control unit is further operative to use the sufficient system information to determine paging blocks assigned to the device by the second base station, and wherein the monitoring unit is operative to monitor the paging channel during the assigned paging blocks to detect for paging messages sent by the second base station to the device.

8. The device of claim 1, wherein the monitoring unit is operative to receive the sufficient system information from a broadcast control channel (BCCH) for the second base station.

9. An apparatus in a wireless communication system, comprising:

means for providing an indication to perform cell reselection from a first base station to a second base station;

means for performing a cell reselection procedure for the second base station in response to the indication to perform cell reselection, wherein the first base station is a current serving cell and the cell reselection procedure selects the second base station as a new serving cell;

means for receiving from a broadcast channel of the second base station sufficient system information to process a paging channel of the second base station;

means for determining which particular time intervals are assigned to the apparatus for the paging channel based on the sufficient system information;

means for starting monitoring of the paging channel upon receiving the sufficient system information from the second base station and prior to completing the cell reselection procedure; and means for monitoring the paging channel during the time intervals assigned to the apparatus to detect for paging messages sent by the second base station to the apparatus;

whereby the apparatus performs an early camping operation which reduces a time gap for receiving paging messages from the second base station during cell reselection;

wherein the sufficient system information is System Information Type 3 in a Global System for Mobile Communications (GSM) system.

10. The apparatus of claim 9, further comprising:

means for receiving a paging message on the paging channel of the second base station prior to completing the cell reselection procedure; and means for responding to the paging message via the second base station after full system information has been received.

11. The apparatus of claim 9, further comprising:

means for receiving a paging message on the paging channel of the second base station prior to completing the cell reselection procedure;

means for aborting the cell reselection procedure; and means for responding to the paging message via the first base station.

12. A method of performing cell reselection at a device in a wireless communication system, comprising:

providing an indication to perform cell reselection from a first base station to a second base station;

performing a cell reselection procedure for the second base station in response to the indication to perform cell reselection, wherein the first base station is a current serving cell and the cell reselection procedure selects the second base station as a new serving cell;

receiving from a broadcast channel of the second base station sufficient system information to process a paging channel of the second base station;

determining which particular time intervals are assigned to the device for the paging channel based on the sufficient system information;

starting monitoring of the paging channel upon receiving the sufficient system information from the second base station and prior to completing the cell reselection procedure; and monitoring the paging channel during the time intervals assigned to the device to detect for paging messages sent by the second base station to the device;

whereby the device performs an early camping operation which reduces a time gap for receiving paging messages from the second base station during cell reselection;

wherein the sufficient system information is System Information Type 3 in a Global System for Mobile Communications (GSM) system.

13. A processor readable media for storing instructions operable in a wireless device to:

provide an indication to perform cell reselection from a first base station to a second base station in a wireless communication system;

perform a cell reselection procedure for the second base station in response to the indication to perform cell reselection, wherein the first base station is a current serving cell and the cell reselection procedure selects the second base station as a new serving cell;

receive from a broadcast channel of the second base station sufficient system information to process a paging channel of the second base station;

determine which particular time intervals are assigned to the wireless device for the paging channel based on the sufficient system information;

start monitoring of the paging channel of the second base station upon receiving the sufficient system information from the second base station and prior to completing the cell reselection procedure, and direct monitoring of the paging channel during the time intervals assigned to the wireless device to detect for paging messages sent by the second base station to the wireless device;

whereby the wireless device performs an early camping operation which reduces a time gap for receiving paging messages from the second base station during cell reselection;

wherein the sufficient system information is System Information Type 3 in a Global System for Mobile Communications (GSM) system.

14. A device in a wireless communication system, comprising:

a reselection unit operative to provide an indication to perform cell reselection from a first base station to a second base station; and a control unit operative to, in response to the indication from the reselection unit, direct decoding of designated system information from a broadcast channel of the second base station, use successful or unsuccessful decoding of the designated system information as reconfirmation of ability to decode a control channel of the second base station prior to performing cell reselection to the second base station, if the designated system information from the second base station is decoded successfully, switch to the second base station and initiate a cell reselection procedure for the second base station, wherein the first base station is a current serving cell and the cell reselection procedure selects the second base station as a new serving cell, and skip the cell reselection procedure if the designated system information is not decoded successfully;

whereby the device performs an early camping operation which reduces a time gap for receiving paging messages from the second base station during cell reselection;

wherein the designated system information includes System Information Type 3 in a Global System for Mobile Communications (GSM) system.

15. The device of claim 14, wherein the control unit is operative to direct reception of full system information for the second base station in order to complete the cell reselection procedure and for two-way communication with the second base station.

16. The device of claim 14, further comprising:

a monitoring unit operative to obtain, from the designated system information, sufficient system information to process a paging channel of the second base station and to initiate monitoring of the paging channel when the cell reselection procedure is initiated.

17. The device of claim 14, further comprising:

a monitoring unit operative to receive sufficient system information to process a paging channel of the second base station and to initiate monitoring of the paging channel upon reception of the sufficient system information and prior to completion of the cell reselection procedure.

18. An apparatus in a wireless communication system, comprising:

means for providing an indication to perform cell reselection from a first base station to a second base station;

means for decoding designated system information from a broadcast channel of the second base station in response to the indication to perform cell reselection;

means for using successful or unsuccessful decoding of the designated system information as reconfirmation of ability to decode a control channel of the second base station prior to performing cell reselection to the second base station;

means for, if the designated system information from the second base station is decoded successfully, switching over to the second base station and performing a cell reselection procedure for the second base station, wherein the first base station is a current serving cell and the cell reselection procedure selects the second base station as a new serving cell; and means for skipping the cell reselection procedure if the designated system information is not decoded successfully;

whereby the apparatus performs an early camping operation which reduces a time gap for receiving paging messages from the second base station during cell reselection;

wherein the designated system information includes System Information Type 3 in a Global System for Mobile Communications (GSM) system.

19. The apparatus of claim 18, further comprising:

means for starting monitoring of a paging channel of the second base station upon receiving sufficient system information to process the paging channel and prior to completing the cell reselection procedure.

20. A method of performing cell reselection in a wireless communication system, comprising:

providing an indication to perform cell reselection from a first base station to a second base station;

decoding designated system information from a broadcast channel of the second base station in response to the indication to perform cell reselection;

using successful or unsuccessful decoding of the designated system information as reconfirmation of ability to decode a control channel of the second base station prior to performing cell reselection to the second base station;

if the designated system information from the second base station is decoded successfully, switching over to the second base station, and performing a cell reselection procedure for the second base station, wherein the first base station is a current serving cell and the cell reselection procedure selects the second base station as a new serving cell; and skipping the cell reselection procedure if the designated system information is not decoded successfully;

whereby an early camping operation is performed which reduces a time gap for receiving paging messages from the second base station during cell reselection;

wherein the designated system information includes System Information Type 3 in a Global System for Mobile Communications (GSM) system.

21. The method of claim 20, wherein the designated system information includes sufficient system information to process a paging channel of the second base station, the method further comprising:

starting monitoring of the paging channel of the second base station upon performing the cell reselection procedure.

22. The method of claim 20, further comprising:

receiving sufficient system information to process a paging channel of the second base station; and starting monitoring of the paging channel of the second base station upon receiving the sufficient system information and prior to completing the cell reselection procedure.

* * * * *